No. 607,238. Patented July 12, 1898.
W. HESTON.
VALVE.
(Application filed May 3, 1897.)
(No Model.)
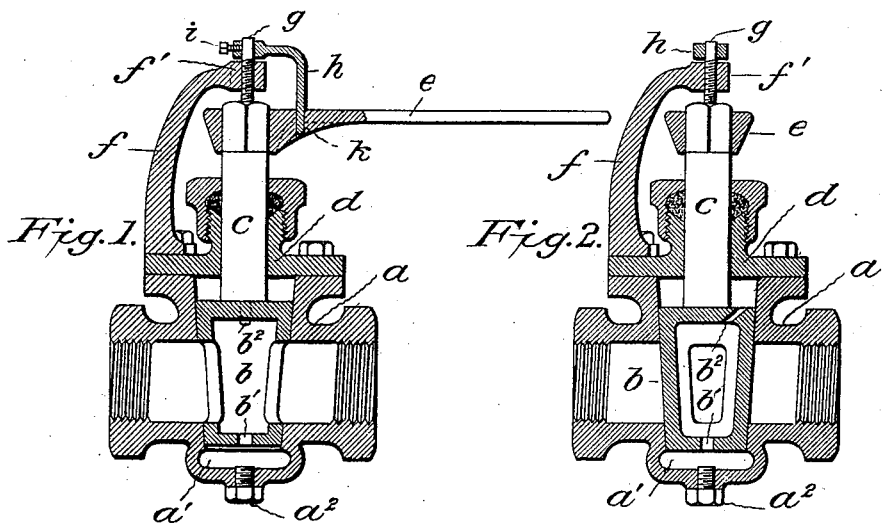
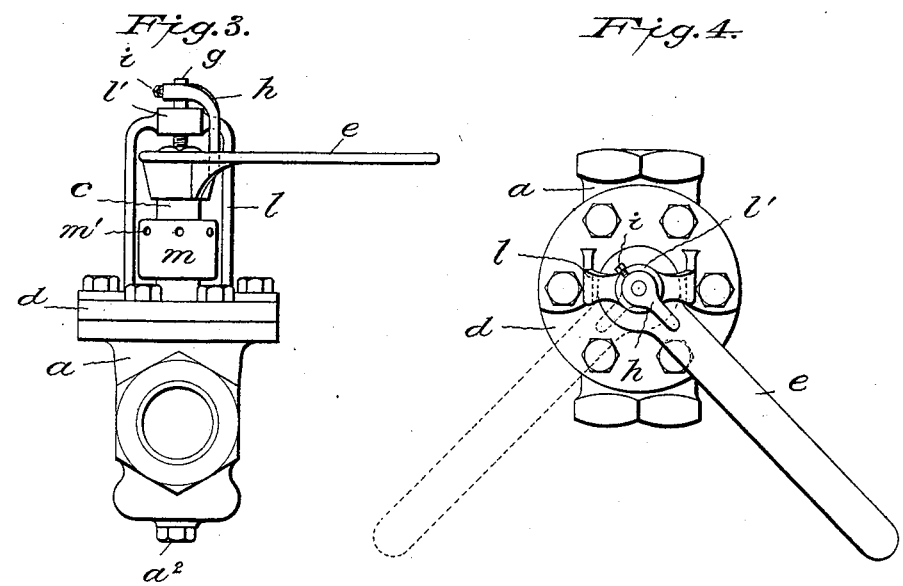
WITNESSES
J. S. Elliott.
E. A. Ginnrel.
INVENTOR
William Heston.
by Wm. F. Fincrel.
Attorney

UNITED STATES PATENT OFFICE.

WILLIAM HESTON, OF HOMESTEAD, PENNSYLVANIA, ASSIGNOR, BY MESNE ASSIGNMENTS, TO THE HOMESTEAD VALVE MANUFACTURING COMPANY, OF SAME PLACE.

VALVE.

SPECIFICATION forming part of Letters Patent No. 607,238, dated July 12, 1898.

Application filed May 3, 1897. Serial No. 634,912. (No model.)

*To all whom it may concern:*

Be it known that I, WILLIAM HESTON, a citizen of the United States, residing at Homestead, in the county of Allegheny and State of Pennsylvania, have invented a certain new and useful Improvement in Valves, of which the following is a full, clear, and exact description.

The object of this invention is to provide means for insuring a leak-tight seating of a plug or other similar valve when closed and for holding it in given position.

In the use of such fluids as water it is not an uncommon experience that in sustaining a load at a desired elevation, to be operated upon at such elevation, the leakage of the valve will allow the load to sink almost imperceptibly, yet none the less surely, to such an extent as to place the load out of alinement with the machine operating upon it. In the present invention I have provided means for practically overcoming this difficulty; and the invention consists of a valve having a plug which is provided with a stem, the latter being supplied with means to turn it, and consequently the plug, and a plug-locking device connected with and operated by such plug-turning means and which is supported in a stand and is arranged directly over the stem in line with, but separated from, it, and which is adapted to operate immediately upon the end of the said stem in the direction of the length of the latter to enable the operator to lock the plug in the desired position, substantially as I will proceed now more particularly to set forth and finally claim.

In the accompanying drawings, illustrating my invention, in the several views of which like parts are similarly designated, Figure 1 is a vertical section showing the valve open, and Fig. 2 is a vertical section showing the valve closed. Fig. 3 is an end elevation of a valve having a modified form of stand and gland, and Fig. 4 is a plan view of the valve of Fig. 3.

The valve-casing $a$, plug $b$, its stem $c$, and cap, bonnet, or cover $d$ may be as usual, and the said stem may have applied a usual handle $e$. The casing $a$ may have the leakage-pocket $a'$ and draining-plug $a^2$, and the plug $b$ may have the draining and balancing port $b'$ and balancing-channel $b^2$, as usual in valves made by me.

A stand $f$, Figs. 1 and 2, is erected upon some part of the valve, it being shown as secured to the cap, and overhangs the stem, and in the head $f'$ of this stand is arranged a screw $g$, whose point is alined with the stem $c$. This screw is adjustably fitted to a finger $h$ by a set-screw $i$, and its point enters a hole $k$ in the handle $e$. As is obvious, as the handle is turned the screw $g$ is rotated and its point made to approach toward and recede from the stem $c$. The screw $g$ is arranged to be moved toward the stem $c$ when the valve is closed, and hence the tendency of said screw is to force the plug tight to its seat, and not only so, but to lock it against accidental movement, thus insuring a leak-tight closing of the valve and a consequent stability not possible with any valve which has not some functionally similar adjunct. As the valve-seat or the plug is worn, and the screw $g$ therefore becomes incapable of seating the plug, the set-screw $i$ may be turned out and the screw $g$ set down farther in the finger $h$ and again secured by the set-screw in order to compensate for such wear. By this construction the set-screw $g$ and the finger $h$, operating in conjunction with the handle $e$, automatically seat and lock the plug.

In Figs. 3 and 4 I have shown the stand made as a two-armed device or yoke $l$, having a head $l'$, in which is arranged the screw $g$, which is connected by finger $h$ with handle $e$. The arms of the yoke $l$ serve to limit the opening and closing throws of the handle $e$, and thus prevent the operator from accidentally turning the plug farther than may be necessary to effect a full opening and closing of the valve. Where the yoke shown in Figs. 3 and 4 is employed, there may not be sufficient room between the arms or limbs of the yoke to admit of the use of an angular stuffing-box, and accordingly I may substitute for an angular stuffing-box the circular stuffing-box $m$, (shown in Figs. 3 and 4,) and such circular stuffing-box will be provided with peripheral holes $m'$ to receive a pin-wrench or spanner.

Another important feature of my invention is that not only will the auxiliary seating and holding device operate to that intent when the valve is fully closed, but it will hold the valve against accidental displacement in whatever position it may be desired to retain it, and in this sense the device serves as a stop.

I do not limit my invention to a valve of the form shown in the drawings, but mean to include as within my invention the use of any form of valve in which the valve proper may be forced to its seat by a device auxiliary to its opening and closing medium. Nevertheless the invention is specially and peculiarly applicable to plug-valves.

What I claim is—

1. A valve, having a plug provided with a stem, and means applied to such stem to turn the plug, combined with a stand, and a plug-locking device connected with and operated by the plug-turning means, supported in said stand directly over said stem, separated from it and in line with it, and adapted to act immediately upon the end of said stem in the direction of its length, to lock the plug in the desired position as said plug is turned, substantially as described.

2. A valve, having a plug provided with a stem, a plug-operating handle on said stem, a stand, and a screw mounted in such stand in line with the stem and wholly independent thereof, and connected with and operated by the said operating-handle to cause the said screw to impinge upon the stem lengthwise and lock the plug in desired position, substantially as described.

3. A valve, having a plug provided with a stem, an operating-handle, a stand adapted to limit the movement of the operating-handle, and a screw arranged in said stand over the plug's stem and wholly independent thereof, and operated by the plug's handle to impinge upon the stem lengthwise and lock the plug in any given position, substantially as described.

In testimony whereof I have hereunto set my hand this 1st day of May, A. D. 1897.

WILLIAM HESTON.

Witnesses:
   JOS. S. STEWART,
   A. W. SNYDER.